(12) United States Patent
Maekawa et al.

(10) Patent No.: US 10,686,333 B2
(45) Date of Patent: Jun. 16, 2020

(54) METHOD FOR MANUFACTURING WIRELESS POWER-TRANSMITTING DEVICE, AND RESONATOR

(71) Applicant: IHI CORPORATION, Tokyo (JP)

(72) Inventors: Yuji Maekawa, Tokyo (JP); Masakazu Hara, Tokyo (JP)

(73) Assignee: IHI CORPORATION, Tokyo (JP)

(*) Notice: Subject to any disclaimer, the term of this patent is extended or adjusted under 35 U.S.C. 154(b) by 134 days.

(21) Appl. No.: 15/008,536

(22) Filed: Jan. 28, 2016

(65) Prior Publication Data

US 2016/0141099 A1 May 19, 2016

Related U.S. Application Data

(63) Continuation of application No. PCT/JP2014/070849, filed on Aug. 7, 2014.

(30) Foreign Application Priority Data

Aug. 8, 2013 (JP) .................... 2013-165528
Aug. 23, 2013 (JP) .................... 2013-173602

(51) Int. Cl.
*H02J 50/12* (2016.01)
*H02J 50/70* (2016.01)
(Continued)

(52) U.S. Cl.
CPC ............. *H02J 50/12* (2016.02); *H01F 29/08* (2013.01); *H01F 38/14* (2013.01); *H02J 7/025* (2013.01); *H02J 50/70* (2016.02)

(58) Field of Classification Search
CPC ............... H02J 38/14; H02J 50/00; H02J 7/00
(Continued)

(56) References Cited

U.S. PATENT DOCUMENTS 3,733,567 A * 5/1973 Johnson .................... H01P 7/04
333/234
4,730,174 A * 3/1988 Nishikawa ................ H01P 7/04
333/224
(Continued)

FOREIGN PATENT DOCUMENTS

CN  102522402 A  6/2012
CN  102668304 A  9/2012
(Continued)

OTHER PUBLICATIONS

International Search Report, PCT/JP2014/070849, dated Oct. 7, 2014, 2 pgs.

*Primary Examiner* — Rexford N Barnie
*Assistant Examiner* — Joseph N Inge
(74) *Attorney, Agent, or Firm* — Volpe and Koenig, P.C.

(57) ABSTRACT

Provided is a method for manufacturing a wireless power-transmitting device including a power-transmitter having a transmission coil, and a power-receiver having a reception coil. The method includes forming, in the electrically-conductive member, an eddy current interruption unit configured to change a state of an eddy current, formed in the electrically-conductive member by the transmission coil (reception coil), by interrupting and redirecting a portion of the eddy current to obtain processed electrically-conductive members, and preparing a plurality of types of the processed electrically-conductive members whose eddy current interruption units are different in form from each other; and selecting one type of the processed electrically-conductive member from the plurality of types of the processed electrically-conductive members and arranging the selected one type of the processed electrically-conductive member near the transmission coil (reception coil), thereby finely adjust- (Continued)

ing the inductance of the transmission coil (reception coil) to reach a preset inductance.

12 Claims, 11 Drawing Sheets

(51) Int. Cl.
  *H02J 7/02* (2016.01)
  *H01F 29/08* (2006.01)
  *H01F 38/14* (2006.01)

(58) Field of Classification Search
  USPC .......................................................... 307/104
  See application file for complete search history.

(56) References Cited

U.S. PATENT DOCUMENTS

| | | | | |
|---|---|---|---|---|
| 6,362,708 | B1* | 3/2002 | Woods | H01P 1/20309 |
| | | | | 333/219.1 |
| 6,518,858 | B2* | 2/2003 | Ando | H01P 1/2053 |
| | | | | 333/134 |
| 6,549,092 | B1* | 4/2003 | Hattori | H01P 1/2053 |
| | | | | 333/134 |
| 8,829,732 | B2 | 9/2014 | Tengner | |
| 9,130,408 | B2 | 9/2015 | Ichikawa | |
| 2003/0052785 | A1* | 3/2003 | Gisselberg | A61B 5/6883 |
| | | | | 340/572.8 |
| 2005/0030251 | A1* | 2/2005 | Okamura | H01Q 1/2216 |
| | | | | 343/895 |
| 2010/0244582 | A1 | 9/2010 | Yoshikawa | |
| 2011/0193421 | A1* | 8/2011 | Urano | H01F 38/14 |
| | | | | 307/104 |
| 2013/0038135 | A1 | 2/2013 | Ichikawa | |
| 2013/0082539 | A1 | 4/2013 | Tengner | |
| 2014/0375262 | A1 | 12/2014 | Yamaguchi et al. | |
| 2015/0244181 | A1 | 8/2015 | Kagami et al. | |
| 2017/0018953 | A1 | 1/2017 | Yamaguchi et al. | |

FOREIGN PATENT DOCUMENTS

| | | |
|---|---|---|
| CN | 103025563 A | 4/2013 |
| CN | 203733601 A | 7/2014 |
| EP | 2595161 A1 | 5/2013 |
| EP | 2763149 A1 | 8/2014 |
| JP | 51-016842 A | 7/1974 |
| JP | 59-081007 A | 5/1984 |
| JP | 59-081008 A | 5/1984 |
| JP | 59-84918 A | 6/1984 |
| JP | 02-021715 U | 2/1990 |
| JP | 10-241969 A | 9/1998 |
| JP | 2003-243226 A | 8/2003 |
| JP | 2007-035894 A | 2/2007 |
| JP | 2009-200174 A | 9/2009 |
| JP | 2010-130878 A | 6/2010 |
| JP | 2011-087433 A | 4/2011 |
| JP | 2011-120382 A | 6/2011 |
| JP | 2012-099644 A | 5/2012 |
| JP | 2012-134374 A | 7/2012 |
| WO | 03/036761 A1 | 5/2003 |
| WO | 2013/046366 A1 | 4/2013 |
| WO | 2013/121729 A1 | 8/2013 |
| WO | 2014/069581 A1 | 5/2014 |

* cited by examiner

METHOD FOR MANUFACTURING WIRELESS POWER-TRANSMITTING DEVICE, AND RESONATOR

Embodiments described herein relates to a method for manufacturing a wireless power-transmitting device, and a resonator.

This application is a Continuation of International Application No. PCT/JP2014/070849, filed on Aug. 7, 2014, claiming priority based on Japanese Patent Application No. 2013-165528, filed on Aug. 8, 2013, and Japanese Patent Application No. 2013-173602, filed on Aug. 23, 2013 the content of which are incorporated herein by reference in their entirety.

TECHNICAL FIELD

Background

In recent years, wireless power-transmitting systems that can perform power supply from a power-transmitting side to a power-receiving side wirelessly are used for various applications, without connecting the power-transmitting side and power-receiving side with a wire (cable).

For example, the wireless power-transmitting systems are used for applications for supplying electric power for charging batteries mounted on vehicles, such as electric vehicles or hybrid vehicles or batteries provided in consumer appliances, such as consumer electronics, or applications for supplying electric power that drives industrial devices (for example, stages, arms, cranes, robots, or the like).

A "magnetic field resonance method" is known as one of the power-transmitting methods used in such wireless power-transmitting systems. The "magnetic field resonance method" is a power-transmitting method in which each of a power-transmitter and a power-receiver includes a resonator having a coil and a capacitor and a magnetic field is resonated between both of the resonators to supply electric power wirelessly. This "magnetic field resonance method" has a feature in which efficient and long-distance power supply is possible with a weak magnetic field compared to an "electromagnetic induction method" that is one of the other power-transmitting methods that are widely put into practical use, and has attracted attention as a next-generation wireless power supply technique.

The coil used for the wireless power-transmitting systems of such a "magnetic field resonance method", that is, a transmission coil used for a power-transmitter or a reception coil used for a power-receiver is adjusted to have preset inductance, is assembled to the power-transmitter or the power-receiver, and is then shipped as a wireless power-transmitting device. The power-transmitter and the power-receiver cannot be paired at the time of factory shipment. By adjusting the inductances thereof respectively to the preset inductances, even if which power-transmitter is combined with which power-receiver, good transmission and reception can always be performed between the power-transmitter and the power-receiver that are combined together.

Adjustment of the inductance in the transmission coil or the reception coil is usually performed by changing the number of turns of the coil or coil pitch.

In the related art, a wireless power-transmitting apparatus, a wireless power-receiving device, and a wireless power-transmitting system are known that are adapted to control the position of an electromagnetic shield with respect to the coil, thereby adjusting the inductance of the coil. (Refer to Patent Document 1).

The details of the above "magnetic field resonance method" are referred to in, for example, the following Patent Document 2.

Patent Document 3 discloses that the resonance frequency of a power-receiving coil is adjusted by adjusting the inductance of an adjustment coil in the wireless power supply of the magnetic field resonance method.

Patent Document 4 discloses an inductance device that has a magnetic body with high saturation magnetic flux density added to a core of a magnetic body and that is not easily saturated even if a large amount of electric current is applied thereto.

Patent Document 5 discloses a winding wire type electronic component and a manufacturing method thereof in which the mass production of cores becomes easy, a variation in inductance value is small, and adherence strength to a printed circuit board when being mounted to the printed circuit board is also stable.

Patent Document 6 discloses a wireless power transmission device that can limit generation of an eddy current in a magnetic material to enhance power transmission efficiency.

Patent Document 7 discloses a variable inductor that has little degradation of a Q value and can be formed on a semiconductor substrate in which a variable range of inductance is wide.

Patent Document 8 discloses a variable inductance wireless power-transmitting device in which power supply degradation is easily avoided.

CITATION LIST

Patent Document

[Patent Document 1] Japanese Unexamined Patent Application, First Publication No. 2011-120382
[Patent Document 2] Japanese Unexamined Patent Application, First Publication No. 2010-130878
[Patent Document 3] Japanese Unexamined Patent Application, First Publication No. 2009-200174
[Patent Document 4] Japanese Unexamined Patent Application, First Publication No. 2007-035894
[Patent Document 5] Japanese Unexamined Patent Application, First Publication No. 2012-099644
[Patent Document 6] Japanese Unexamined Patent Application, First Publication No. 2011-087433
[Patent Document 7] Japanese Unexamined Patent Application, First Publication No. H10-241969
[Patent Document 8] Japanese Unexamined Patent Application, First Publication No. 2003-243226

SUMMARY

Technical Problem

In the manufacture of the above wireless power-transmitting device, it is difficult to change the number of turns of the coil or the coil pitch as mentioned above, when it is determined that it is necessary to finely adjust the inductance of the coil, for example, at the time of final inspection particularly after the power-transmitter or the power-receiver is assembled. Under the present circumstances, it is necessary to assemble the power-transmitter or the power-receiver again after the assembled power-transmitter or power-receiver is disassembled and the number of turns of the coil or the coil pitch is changed. Therefore, this hinders a reduction of manufacturing costs.

The technique of Patent Document 1 is related to the wireless power-transmitting apparatus, the wireless power-receiving device, and the wireless power-transmitting system, and it is difficult to apply this technique to a method for manufacturing a wireless power-transmitting device.

In order to supply electric power wirelessly in the wireless power-transmitting system using the "magnetic field resonance method" as described above, it is necessary to resonate a resonator on a power-transmitting side and a resonator on a power-receiving side.

Therefore, in such a wireless power-transmitting system, it is necessary to precisely adjust the resonance frequency of both of the resonator provided on the power-transmitting side and the resonator provided on the power-receiving side from a viewpoint of realizing efficient power supply.

In the related art, since the resonance frequency is adjusted by adjusting the number of mounted capacitors or the number of turns of a coil (inductor) that is provided in a resonator while checking the waveform (for example, the waveform of an electric current that flows to the resonator) of respective parts of the wireless power-transmitting system, there is a problem that considerable time is required for the adjustment.

Particularly when resonators are mass-produced, the productive efficiency of the resonator is largely influenced by the efficiency of the above adjustment work, and it is necessary to improve the adjustment efficiency of the resonance frequency in order to enhance the productive efficiency of the resonators.

The disclosure is made in view of such circumstances, and an object thereof is to provide a method for manufacturing a wireless power-transmitting device that facilitates fine adjustment of the inductance of a transmission coil or a reception coil.

The disclosure is made in view of the above circumstances, and an object thereof is to provide a resonator that can easily adjust resonance frequency in a short amount of time.

Solution to Problem

A first aspect of the disclosure relates to a method for manufacturing a wireless power-transmitting device having at least one of a power-transmitter and a power-receiver in a wireless power-transmitting system that includes the power-transmitter having a transmission coil and the power-receiver having a reception coil and that is configured to supply electric power wirelessly from the power-transmitter to the power-receiver through transmission and reception from the transmission coil to the reception coil with the transmission coil and the reception coil being made to face each other. The above manufacturing method includes a step of preparing an electrically-conductive member for electromagnetic shielding to be arranged near the transmission coil or the reception coil, on a side of the transmission coil opposite to a side of the transmission coil facing the reception coil, or a side of the reception coil opposite to a side of the reception coil facing the transmission coil. The above manufacturing method further includes a step of forming, in the electrically-conductive member, an eddy current interruption unit including a slit or a hole configured to change a state of an eddy current formed in the electrically-conductive member by the transmission coil or the reception coil by interrupting and redirecting a portion of the eddy current to obtain processed electrically-conductive members, and preparing a plurality of types of the processed electrically-conductive members whose eddy current interruption units are different in form from each other. The above manufacturing method further includes a step of selecting one type of the processed electrically-conductive member from the plurality of types of the processed electrically-conductive members and arranging the selected one type of the processed electrically-conductive member near the transmission coil or the reception coil, thereby finely adjusting the inductance of the transmission coil or the reception coil to reach a preset inductance.

In a second aspect of the disclosure, in accordance with the above first aspect, the transmission coil or the reception coil is a coil obtained by winding a conducting wire in a helix shape and a square tubular shape.

In a third aspect of the disclosure, in accordance with the above second aspect, the eddy current interruption unit is a slit, and the slit is formed in a direction intersecting a winding direction of the conducting wire.

In a fourth aspect of the disclosure, in accordance with the above third aspect, the slit is formed so that both ends of the slit are respectively located outside both ends of the coil in the direction of a central axis of the coil.

In a fifth aspect of the disclosure, in accordance with the above first aspect, the transmission coil or the reception coil is a coil obtained by winding a conducting wire in a spiral shape within a plane.

In a sixth aspect of the disclosure, in accordance with the above fifth aspect, the eddy current interruption unit is a slit, and the slit is formed in a radial direction from the center of the coil.

In a seventh aspect of the disclosure, in accordance with the above sixth aspect, the slit is located so as to extend from a portion closer to the inside than the coil to a portion closer to the outside than the coil.

An eighth aspect of the disclosure is a resonator including a core member formed of a magnetic material and provided with an adjustment hole for adjustment of a resonance frequency; a coil wound around the core member; and an adjusting jig formed of a magnetic material and a non-magnetic material and inserted into the adjustment hole in order to adjust the resonance frequency.

In a ninth aspect of the disclosure, in accordance with the above eighth aspect, the core member is provided with a plurality of the adjustment holes, and the number of the adjusting jigs inserted into the adjustment holes depends on the desired amount of the adjustment of the resonance frequency.

In a tenth aspect of the disclosure, in accordance with the above eighth aspect, the core member is provided with a plurality of the adjustment holes having different depths, and the adjusting jig is inserted into the adjustment hole having depth suitable for length of the adjustment jig.

In an eleventh aspect of the disclosure, in accordance with any one of the above eighth to tenth aspects, the adjusting jig includes a plate-shaped magnetic body and a plate-shaped non-magnetic body that is laminated on the magnetic body to set the thickness of the adjusting jig to a thickness suitable for the size of the adjustment hole, and the adjusting jig having the magnetic body with a thickness suitable for the adjustment of the resonance frequency is inserted into the adjustment hole.

In a twelfth aspect of the disclosure, in accordance with any one of the above eighth to tenth aspects, the adjusting jig is a mixture of a magnetic material and a non-magnetic material, and the adjusting jig whose ratio of the magnetic material to the non-magnetic material is set at a value suitable for the adjustment of the resonance frequency is inserted into the adjustment hole.

In a thirteenth aspect of the disclosure, in accordance with any one of the eighth to twelfth aspects, the resonator further includes a lid member configured to prevent slip-out of the adjusting jig inserted into the adjustment hole.

In a fourteenth aspect of the disclosure, in accordance with any one of the eighth to thirteenth aspects, the resonator further includes a capacitor that is connected to the coil and forms a resonance circuit together with the coil.

Advantageous Effects of Invention

According to the method for manufacturing the wireless power-transmitting device of the disclosure, the inductance of the transmission coil or the reception coil is finely adjusted so that the transmission coil or the reception coil has a preset inductance by preparing the plurality of types of processed electrically-conductive members whose eddy current interruption units are different in form from each other and selecting one type of processed electrically-conductive member from these processed electrically-conductive members. Therefore, the inductance of the transmission coil or the reception coil can be finely adjusted simply by the replacement of the processed electrically-conductive members. Accordingly, the inductance of the coil can be easily and finely adjusted, for example, even after the power-transmitter or the power-receiver is assembled. Hence, manufacturing costs can be reduced.

According to the resonator of the disclosure, the resonance frequency is adjusted by forming the adjustment hole for adjustment of the resonance frequency in the core member, and inserting an adjusting jig formed of the magnetic material and the non-magnetic material into the adjustment hole. Therefore, since the adjustment of the resonance frequency can be performed simply by inserting the adjusting jig into the adjustment hole, it is possible to easily adjust the resonance frequency in a short amount of time.

DESCRIPTION OF EMBODIMENTS

First Embodiment

Figure 1:
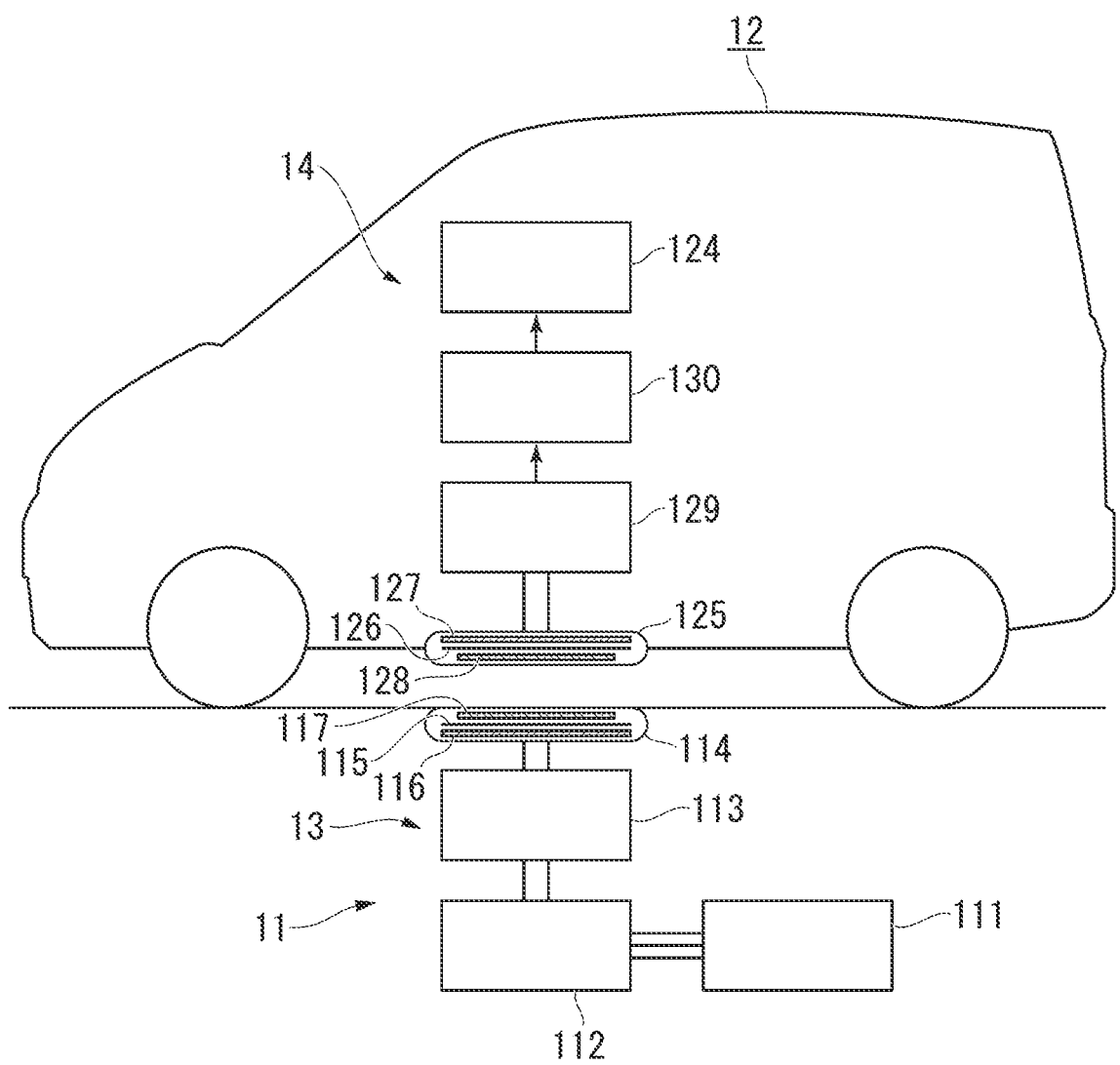
FIG. 1 is a block diagram showing the configuration of main portions of a wireless power-transmitting device according to a first embodiment of the disclosure.

Hereinafter, a method for manufacturing a wireless power-transmitting device of the disclosure will be described in detail.

First, an example of a wireless power-transmitting device obtained by the method for manufacturing according to the disclosure will be described with reference to FIG. 1 that is a block diagram showing the configuration of main portions. Reference numeral 11 in FIG. 1 denotes a wireless power-transmitting system including the wireless power-transmitting device according to the disclosure, and the wireless power-transmitting system 11 is a system (device) for charging a battery mounted on a vehicle, such as an electric vehicle or a hybrid vehicle.

The wireless power-transmitting system 11 is configured to include a power-transmitting device 13 installed on the surface of the earth, and a power-receiving device 14 provided in the vehicle 12. The power-transmitting device 13 is installed on the surface of the earth, and is configured so that electric power (electric power for charging a battery 124) can be transmitted to the power-receiving device 14 of the vehicle 12 wirelessly when the vehicle 12 traveling on the ground is stopped in a predetermined positional relationship (a positional relationship in which an electromagnetic coupling circuit to be described below is formed).

The power-transmitting device 13 is configured to include an external power source 111, a rectifier circuit 112, a power-transmitting circuit 113, a power-transmitter 114, and the like. The external power source 111 is a power source that supplies the electric power required to generate the electric power to be transmitted to the vehicle 12, and is, for example, a power source that supplies three-phase AC power of which the voltage is 200 [V]. The external power source 111 may be a power source that is not limited to the three-phase AC power source, and may be a single-phase AC power source like a commercial AC power source.

The rectifier circuit 112 is a circuit that rectifies the AC power supplied from the external power source 111, and converts the rectified AC power into DC power. It is also possible to use a DC power source, such as a fuel cell or a solar cell, as the external power source 111, and the rectifier circuit 112 can be omitted in that case.

The power-transmitting circuit 113 supplies the electric power, which is supplied from the rectifier circuit 112, to the vehicle 12 wirelessly via the electromagnetic coupling circuit formed by the power-transmitter 114, and the power-receiver 125 that is provided in the vehicle 12. Specifically, the power-transmitting circuit 113 includes a resonating capacitor that constitutes a power-transmitting resonance circuit together with the transmission coil 115 provided in the power-transmitter 114, and converts the DC power from the rectifier circuit 112 into AC power (high-frequency power) having a higher frequency than the AC power of the external power source 111 to apply the converted AC power to the transmission coil 115 provided in the power-transmitter 114, thereby realizing wireless power supply with respect to the vehicle 12.

That is, the wireless power supply is made possible by performing transmission from the transmission coil 115 to the reception coil 126 provided in the power-receiver 125 in the power-receiving device 14 of the vehicle 12.

The power-transmitter 114 is installed on the surface of the earth, and is configured to include the transmission coil 115, a power-transmitting shield plate 116 (electrically-conductive member), and a power-transmitting conductor plate 117 within a housing (not shown). The transmission coil 115 is a coil for supplying the AC power, which is supplied from the power-transmitting circuit 113 as mentioned above, to the vehicle 12 wirelessly, and is, for example, a solenoid coil having coil shape dimensions that are specified in advance. Such a power-transmitter 114 will be described below in detail.

The power-receiver 125 is provided in the vehicle 12, and is configured to include the reception coil 126, a power-receiving shield plate 127 (electrically-conductive member), and a power-receiving conductor plate 128 within a housing (not shown) as will be described below. The reception coil 126 is, for example, a solenoid coil having almost the same coil diameter as the transmission coil 115. Here, the wireless power-transmitting device according to the disclosure is constituted of a device having at least one of such a power-receiver 125 and power-transmitter 114, that is, the power-receiving device 14 or the power-transmitting device 13.

When the power-transmitter 114 and the power-receiver 125 that is provided in the vehicle 12 approach each other and accordingly the transmission coil 115 and the reception coil 126 are located in an approaching state, the above electromagnetic coupling circuit is formed. The electromagnetic coupling circuit means a circuit in which the transmission coil 115 and the reception coil 126 are electromagnetically coupled together, and wireless power supply from the transmission coil 115 to the reception coil 126 is performed, and may be any circuit of a circuit that supplies electric power through an "electromagnetic induction method" and a circuit that supplies electric power through an "electromagnetic field resonance method".

The vehicle 12, as shown in FIG. 1, includes the power-receiving device 14. Although omitted in FIG. 1, the vehicle 12 includes components required for traveling, such as a motor, a steering wheel, a brake, and the like.

The power-receiving device 14 includes the power-receiver 125, a power-receiving circuit 129, a charging circuit 130, and a battery 124. The power-receiver 125, as mentioned above, includes the reception coil 126, the power-receiving shield plate 127, and the power-receiving conductor plate 128. The reception coil 126 is provided at the bottom of the vehicle 12 in a posture in which coil axes of the reception coil 126 and the transmission coil 115 become parallel to each other so as to be capable of facing the transmission coil 115 of the power-transmitter 114.

The power-receiving circuit 129 receives the electric power (AC power) supplied wirelessly via the electromagnetic coupling circuit formed by the transmission coil 115 and the reception coil 126, converts the received electric power into DC power, and outputs the converted DC power to the charging circuit 130. The power-receiving circuit 129 includes a resonating capacitor that constitutes a power-receiving resonance circuit together with the reception coil 126. The electrostatic capacity of the resonating capacitor of the power-receiving circuit 129 is set so that the resonance frequency of the power-receiving resonance circuit reaches the same frequency as the resonance frequency of the aforementioned power-transmitting resonance circuit.

The charging circuit 130 has an input terminal connected to an output terminal of the power-receiving circuit 129, has an output terminal connected to an input terminal of the battery 124, and charges the battery 124 with the electric power (DC power) from the power-receiving circuit 129. The battery 124 is a rechargeable battery (for example, a secondary battery, such as a lithium ion battery or a nickel hydride battery) that is mounted on the vehicle 12, and supplies electric power to a traveling motor that is not shown. The charging circuit 130 is controlled by a control unit for power reception (not shown) on the basis of a control program for power reception that is prepared in advance.

Next, the power-transmitter 114 and the power-receiver 125 according to the disclosure will be described in detail.

Figure 2A:
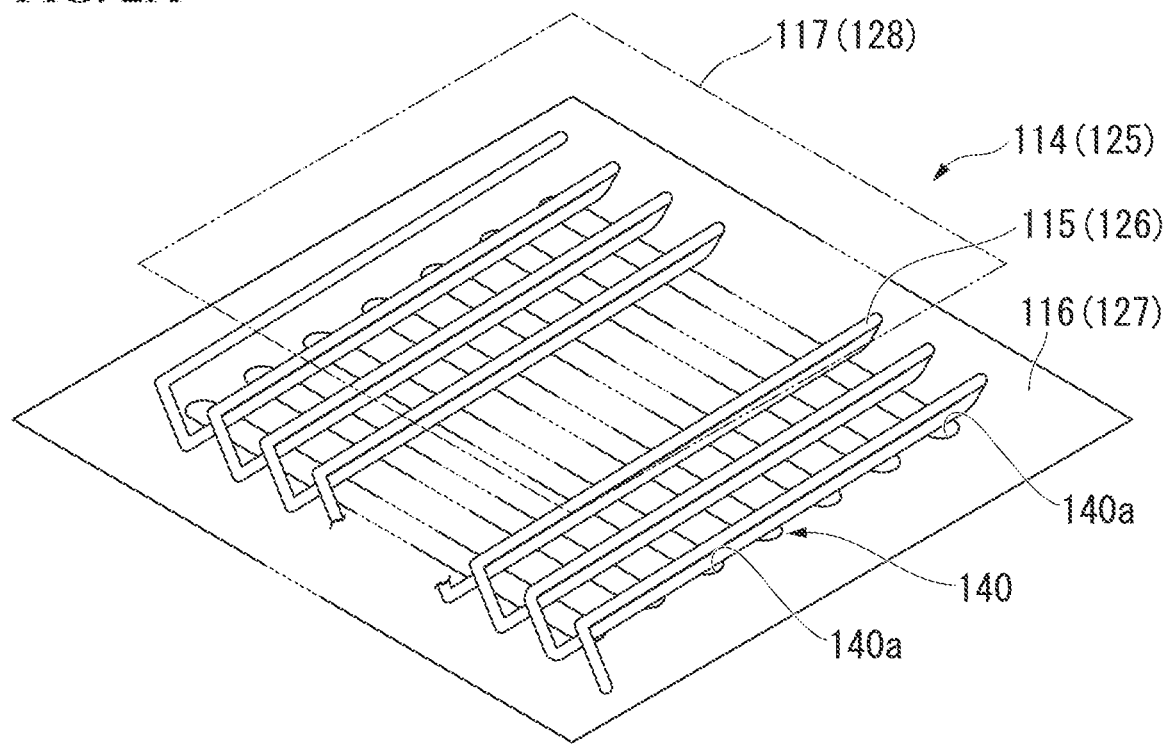
FIG. 2A is a perspective view schematically showing the schematic configuration of a power-transmitter or a power-receiver according to the first embodiment of the disclosure.

As shown in FIG. 2A, the power-transmitter 114 has the housing that is not shown, and the transmission coil 115, the power-transmitting shield plate 116, and the power-transmitting conductor plate 117 that are arranged in the housing.

In the present embodiment, the transmission coil 115 is a solenoid type coil having coil shape dimensions that are specified in advance, that is, a coil in which a conducting wire is wound in a helix and flat square tubular shape around a flat plate-shaped core member (not shown). It is noted herein that the transmission coil 115, as will be described below, may be a circular type coil.

Figure 2B:
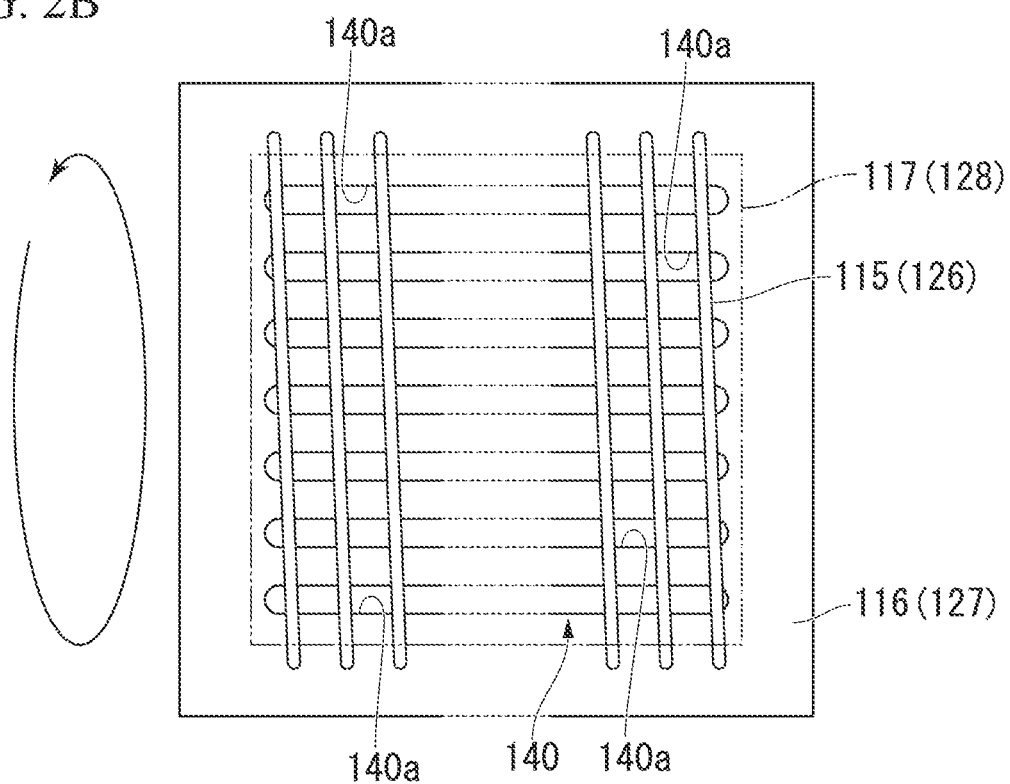
FIG. 2B is a top view schematically showing the schematic configuration of the power-transmitter or the power-receiver according to the first embodiment of the disclosure.

The solenoid type transmission coil 115 wound in the square tubular shape is formed in a rectangular shape in a top view as shown in FIG. 2B. As shown in FIG. 2A, the power-transmitting shield plate 116 (electrically-conductive member) is arranged on one side of the transmission coil 115, and the power-transmitting conductor plate 117 is arranged on the other side of the transmission coil 115. The power-transmitting shield plate 116 and the power-transmitting conductor plate 117 are arranged to face the transmission coil 115 so as to become parallel to the coil axis of the transmission coil 115.

The power-transmitting conductor plate 117 is formed of an aluminum plate or the like formed as a structure, and is arranged on the reception coil 126 (of the power-receiver 125 shown in FIG. 1) side of the transmission coil 115, that is, on a side of the transmission coil 115 facing the reception coil 126. The power-transmitting conductor plate 117 is formed in a rectangular shape with almost the same dimensions as the shape of the transmission coil 115 in the top view as shown in FIG. 2B, and is arranged directly above the transmission coil 115 so as to substantially overlap the transmission coil 115 in a top-view state. The power-transmitting conductor plate 117 is arranged so as to be sufficiently separated from the transmission coil 115. Accordingly, an eddy current is generated. However, since the distance from the transmission coil 115 is long, there is almost no influence on the inductance of the transmission coil 115. Accordingly, a change in the inductance of the transmission coil 115 is not brought about. The power-transmitting conductor plate 117 can also be omitted.

The power-transmitting shield plate 116 (electrically-conductive member) is arranged on a side of the transmission coil 115 opposite to the side of the transmission coil 115 facing the reception coil 126 of the power-receiver 125 shown in FIG. 1. The power-transmitting shield plate 116 can be easily attached to and removed from a preset position within the housing (near the transmission coil 115).

The power-transmitting shield plate 116 is formed in a sufficiently larger rectangular shape than the shape of the transmission coil 115 in the top view as shown in FIG. 2B, and is arranged directly below the transmission coil 115 so that the transmission coil 115 is located in the power-transmitting shield plate 116 in a top-view state. The power-transmitting shield plate 116 is arranged near the transmission coil 115, that is, is arranged via a slight gap. Accordingly, an eddy current in the counterclockwise direction as indicated by an arrow in FIG. 2B or in the clockwise direction is generated within the plane of the transmission coil 115 by the transmission coil 115.

The formation of the eddy current in such a power-transmitting shield plate 116 affects the inductance of the transmission coil 115, and the inductance of the transmission coil 115 changes depending on the magnitude or the like of the eddy current formed.

Thus, in the present embodiment, as shown in FIG. 2B, an eddy current interruption unit 140 that interrupts a portion of the eddy current formed in the power-transmitting shield plate 116 due to the transmission coil 115, redirects the interrupted eddy current, and changes the state of the above eddy current is formed.

In the present embodiment, the eddy current interruption unit 140 is constituted by a plurality of slits 140a that pass through front and back surfaces of the power-transmitting shield plate 116. The slits 140a are formed in the shape of an elongated hole, and are formed to extend in a direction substantially orthogonal to a winding direction of a conducting wire that forms the transmission coil 115, in the present embodiment. That is, the slits 140a are formed to extend in a direction along the coil axis (central axis) of the transmission coil 115. The slits 140a are formed so that both ends thereof are respectively located outside both ends of the transmission coil 115 in the direction of the coil axis (central axis).

As the slits 140a are formed in this way, the slits 140a (eddy current interruption unit 140) interrupt a portion of the eddy current formed in the power-transmitting shield plate 116 by the transmission coil 115, redirect a portion of the eddy current, and thereby change the state of the eddy current compared to a state where there are no slits 140a. That is, by changing the state of the eddy current, the inductance of the transmission coil 115 is changed, and the inductance is made to be an optimum inductance that matches the reception coil 126 of the power-receiver 125. In particular, since both ends of the slits 140a are respectively formed so as to be located outside both ends of the transmission coil 115 in the direction of the coil axis (central axis), the eddy current formed in the power-transmitting shield plate 116 is more largely interrupted and is greatly redirected, and thereby the state of the eddy current is more greatly changed so as to match the reception coil 126.

The power-receiver 125 also has substantially the same configuration as the power-transmitter 114 shown in FIG. 2A, and includes the reception coil 126, the power-receiving shield plate 127 (electrically-conductive member), and the power-receiving conductor plate 128 within the housing (not shown). The power-receiving shield plate 127 is arranged on one side of the reception coil 126, and the power-receiving conductor plate 128 is arranged on the other side of the reception coil 126. The power-receiving shield plate 127 and the power-receiving conductor plate 128 are arranged to face the reception coil 126 so as to become parallel to the coil axis of the reception coil 126. However, the power-receiving conductor plate 128 can also be omitted similar to the power-transmitting conductor plate 117.

The eddy current interruption unit 140 including the slits 140a is formed in the power-receiving shield plate 127 arranged near the reception coil 126, similar to the power-transmitting shield plate 116, on the side of the reception coil 126 opposite to the side of the reception coil 126 facing the transmission coil 115. Accordingly, the inductance of the reception coil 126 is also changed, and the inductance becomes an optimum inductance that matches the transmission coil 115 of the power-transmitter 114.

Here, the plurality of slits 140a that constitute the eddy current interruption unit 140, as shown in FIG. 2B, are formed substantially parallel to each other and at equal intervals, extend in the direction along the coil axis (central axis) of the transmission coil 115 (or reception coil 126), and are formed so that both ends thereof are respectively outside both ends of the transmission coil 115 (or reception coil 126). Various forms of the slits 140a can be adopted as long as the slits 140a can interrupt a portion of the eddy current, redirect the eddy current, and change the state of the eddy current compared to a state where there is no slit 140a.

Specifically, the number of slits 140a is arbitrary, including one, and the width or the length thereof is also suitably set according to the shape or the like of the transmission coil 115 or the reception coil 126. If the plurality of slits 140a are formed, the widths or the lengths thereof may be separately changed without making all of the widths or the lengths the same. One slit 140a shown in FIG. 2B may be split into a plurality of slits, and the widths or the lengths of the split slits may be changed even in such a case. The arrangement of the split slits may be made orderly or may be made randomly. The thickness of an electrically-conductive plate that forms the power-transmitting shield plate 116 or the power-receiving shield plate 127 may be changed in order to change the depth of the slits.

Moreover, as a form in which the slits 140a are extremely shortened, just a hole may be formed, and this hole may be adopted as a constituent element of the eddy current interruption unit 140. Even in such a case, the number or arrangement of holes may be arbitrary, and the holes may be arrayed in a length direction of the slits 140a, that is, the direction along the coil axis (central axis) of the transmission coil 115 (or reception coil 126), and for example, may be arranged in zigzag. The holes may be completely randomly arranged or some of the holes may be orderly arranged and the remaining holes may be randomly arranged.

Next, a method for manufacturing the power-transmitter 114 or the power-receiver 125, including the power-transmitting shield plate 116 or the power-receiving shield plate 127 in which such an eddy current interruption unit 140 is formed, will be described.

First, a plurality of electrically-conductive plates, such as copper plates, are respectively prepared as electrically-conductive members for the power-transmitting shield plate 116 and for the power-receiving shield plate 127.

Next, the eddy current interruption units 140 are respectively formed in the plurality of electrically-conductive plates, and the power-transmitting shield plate 116 and the power-receiving shield plate 127 are formed as processed electrically-conductive members. It is noted herein that the eddy current interruption units 140 that are respectively formed in the plurality of electrically-conductive plates are made different in form from each other, and thereby, a plurality of types of processed electrically-conductive members (the power-transmitting shield plates 116 and the power-receiving shield plates 127) are formed. Specifically, as mentioned above, the number, the widths, or the lengths of the slits, are changed between the electrically-conductive plates, or the widths or the lengths of the plurality of slits formed in the same electrically-conductive plate are changed. Some or all of the slits are changed into holes. Moreover, the depths of the slits are changed by preparing electrically-conductive plates with different thicknesses in advance.

Next, the transmission coil 115 and the power-transmitting conductor plate 117 are disposed within the housing and the reception coil 126 and the power-receiving conductor plate 128 are disposed within the housing in order to assemble the power-transmitter 114 and the power-receiver 125 including such processed electrically-conductive members (the power-transmitting shield plate 116 and the power-receiving shield plate 127).

Next, one type of processed electrically-conductive member is selected from the plurality of types of processed electrically-conductive members (power-transmitting shield plates 116), and is arranged on opposite side of the power-transmitting conductor plate 117 near the transmission coil 115. When the power-transmitting shield plate 116 is arranged near the transmission coil 115 and an electric current flows through the transmission coil 115, an eddy current is formed (flows) in the power-transmitting shield plate 116, and the inductance of the transmission coil 115 changes compared to a state where the eddy current interruption unit 140 is not formed in the power-transmitting shield plate 116 due to the influence of the formation of the eddy current. That is, the inductance of the transmission coil 115 can be changed compared to a state where the power-transmitting shield plate 116 without the eddy current interruption unit 140 is used.

Accordingly, an appropriate type of processed electrically-conductive member is selected from the plurality of types of processed electrically-conductive members (power-transmitting shield plates 116) that are prepared in advance so as to adjust the inductance of the transmission coil to reach a preset inductance, and is arranged near the transmission coil 115. It is noted therein that the change in the inductance of the transmission coil 115 according to the form of the eddy current interruption unit 140 is about several percent with respect to its original inductance. Accordingly, the adjustment of the inductance based on the selection of such a processed electrically-conductive member (power-transmitting shield plate 116) is fine adjustment.

Regarding the power-receiver 125, similar to the power-transmitter 114, the inductance of the reception coil 126 is finely adjusted by selecting an appropriate type of processed electrically-conductive member from the plurality of types of processed electrically-conductive members (power-receiving shield plates 127) that are prepared in advance and arranging the selected processed electrically-conductive member near the reception coil 126.

The power-transmitter 114 and the power-receiver 125 can be obtained by appropriately selecting the power-transmitting shield plate 116 and the power-receiving shield plate 127, respectively, in this way. Accordingly, the wireless power-transmitting device including those according to the disclosure can be manufactured.

In such a manufacturing method, the inductance of the transmission coil 115 or the reception coil 126 is finely adjusted so that the transmission coil 115 or the reception coil 126 has a preset inductance by changing the form of the eddy current interruption unit 140 to form the plurality of types of processed electrically-conductive members (the power-transmitting shield plates 116 or the power-receiving shield plates 127) and selecting one type of processed electrically-conductive member from these processed electrically-conductive members. Therefore, the inductance of the transmission coil 115 or the reception coil 126 can be finely adjusted simply by the replacement of the processed electrically-conductive members (the power-transmitting shield plates 116 or the power-receiving shield plates 127). Accordingly, the inductance of the transmission coil 115 or the reception coil 126 can be easily and finely adjusted, for example, even after the power-transmitter 114 or the power-receiver 125 is assembled. Hence, manufacturing costs can be reduced.

The eddy current interruption unit 140 is constituted by the slits 140a, and the slits 140a are formed in the direction intersecting the winding direction of the conducting wire of the transmission coil 115 or the reception coil 126. Therefore, the eddy current formed in the power-transmitting shield plate 116 or the power-receiving shield plate 127 can be more efficiently interrupted. Accordingly, the inductance of the transmission coil 115 or the reception coil 126 can be more greatly changed by more greatly redirecting the formed eddy current. Accordingly, the fine adjustment of the inductance of the transmission coil 115 or the reception coil 126 using the power-transmitting shield plate 116 or the power-receiving shield plate 127 can be more effectively performed.

The slits 140a are formed so that both ends thereof are respectively located outside both ends of the transmission coil 115 or the reception coil 126 in the direction of the coil axis (central axis). Therefore, the eddy current formed in the power-transmitting shield plate 116 or the power-receiving shield plate 127 can be more efficiently interrupted. Accordingly, the inductance of the transmission coil 115 or the reception coil 126 can be more greatly changed.

The eddy current interruption unit 140 is formed in the power-transmitting shield plate 116 or the power-receiving shield plate 127 in this way, and a path for the eddy current is changed. Thus, for example, particularly in a case where the path for the eddy current is shortened, the loss resulting from heat generation or the like caused by the eddy current can be reduced, and power supply efficiency can be enhanced.

The disclosure is not limited to the above embodiment, and various changes can be made without departing from the scope of the disclosure.

Figure 3A:
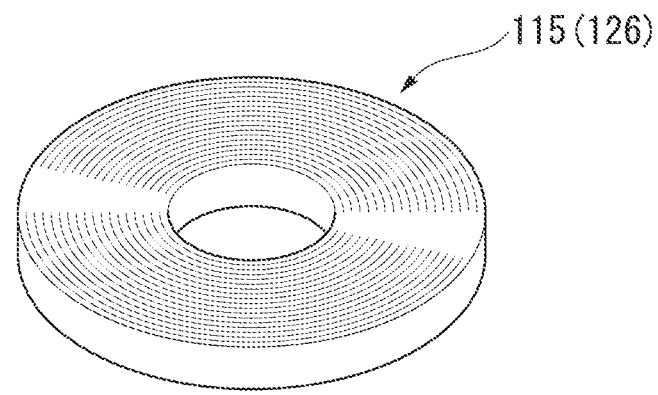
FIG. 3A is a perspective view showing another example of a transmission coil or a reception coil according to the first embodiment of the disclosure.

For example, in the above embodiment, the transmission coil or the reception coil according to the disclosure is the solenoid type coil in which the conducting wire is wound in the helix and flat square tubular shape. Otherwise, however, the transmission coil or the reception coil may be, for example, a circular type coil in which a conducting wire is spirally wound within a plane as shown in FIG. 3A.

Figure 3B:
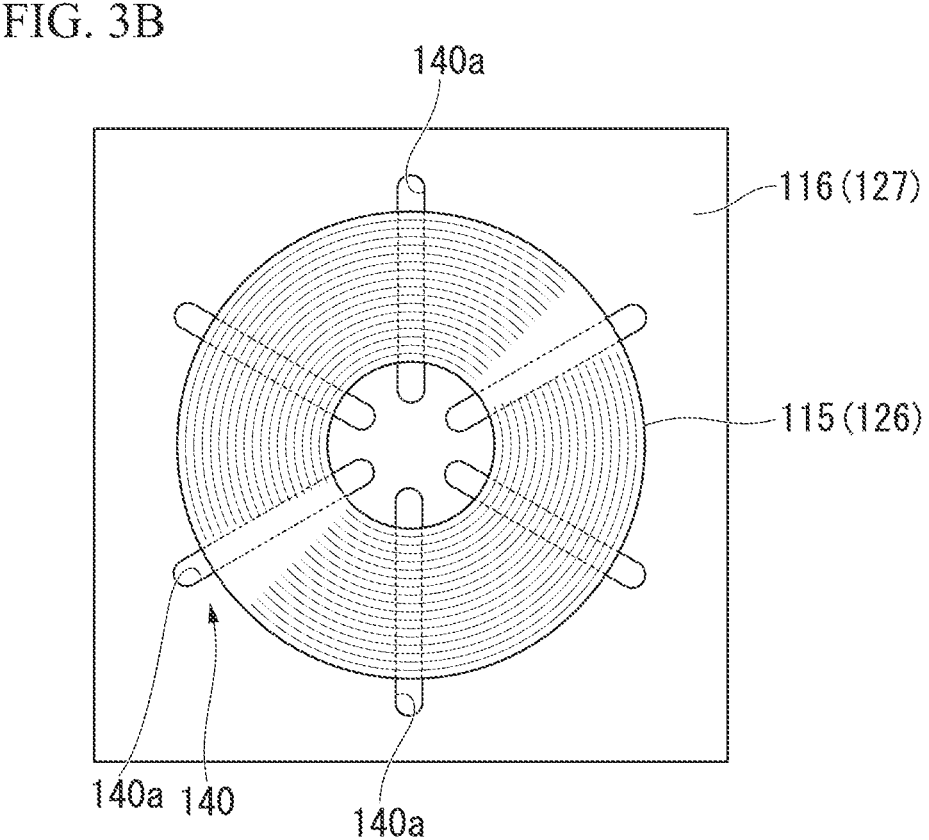
FIG. 3B is a top view schematically showing the schematic configuration of the power-transmitter or the power-receiver according to the first embodiment of the disclosure.

Even in such a case, the eddy current interruption unit 140 is formed in the power-transmitting shield plate 116 or the power-receiving shield plate 127 arranged near the transmission coil 115 or the reception coil 126 of such a circular type. In that case, as shown in FIG. 3B, it is preferable to form the eddy current interruption unit 140 including the plurality of slits 140a formed so as to extend in a radial direction from the center of the transmission coil 115 (reception coil 126). In that case, it is preferable to form the slits 140a whose both ends are located so as to extend from a portion closer to the inside than the transmission coil 115 (reception coil 126) to a portion closer to the outside than the transmission coil 115 (reception coil 126).

Even when the transmission coil 115 or the reception coil 126 of such a circular type is used, the form of the eddy current interruption unit 140 can be changed to form the plurality of types of processed electrically-conductive members (the power-transmitting shield plates 116 or the power-receiving shield plates 127), one type of processed electrically-conductive member can be selected from the processed electrically-conductive members, and the inductance of the transmission coil 115 or the reception coil 126 can be finely adjusted. Accordingly, the inductance of the transmission coil 115 or the reception coil 126 can be easily and finely adjusted, for example, even after the power-transmitter 114 or the power-receiver 125 is assembled, and manufacturing costs can be reduced.

Since the eddy current interruption unit 140 is constituted by the slits 140a, and the slits 140a are formed in the radial direction from the center of the transmission coil 115 or the reception coil 126, the eddy current formed in the power-transmitting shield plate 116 or the power-receiving shield plate 127 can be more efficiently interrupted. Accordingly, by more greatly redirecting the formed eddy current, the inductance of the transmission coil 115 or the reception coil 126 can be more greatly changed. Accordingly, the fine adjustment of the inductance of the transmission coil 115 or the reception coil 126 using the power-transmitting shield plate 116 or the power-receiving shield plate 127 can be more effectively performed.

Since the slits 140a are formed so that both ends thereof are located so as to extend from the portion closer to the inside than the transmission coil 115 or the reception coil 126 to the portion closer to the outside than the transmission coil 115 or the reception coil 126, the eddy current formed in the power-transmitting shield plate 116 or the power-receiving shield plate 127 can be more efficiently interrupted. Accordingly, the inductance of the transmission coil 115 or the reception coil 126 can be more greatly changed.

In the above embodiment, the processed electrically-conductive member according to the disclosure is constituted of the single electrically-conductive plate. However, the processed electrically-conductive member may be constituted of, for example, two electrically-conductive plates in which the slits are formed. In that case, the two electrically-conductive plates are brought into close contact with each other and the slits are made to communicate with each other. When these electrically-conductive plates are arranged near the transmission coil 115 or the reception coil 126 and the inductance of these coils is finely adjusted, the electrically-conductive plates are appropriately shifted if necessary, and the form of the eddy current interruption unit constituted by the slits is changed by changing the width or the length of the slits.

That is, by shifting a pair of electrically-conductive plates from each other and changing the form of the eddy current interruption unit, a plurality of types of processed electrically-conductive members can be consequently prepared. Therefore, by selecting an appropriate type of processed electrically-conductive member from the plurality of types of processed electrically-conductive members that are prepared in this way, that is, the processed electrically-conductive members respectively having the eddy current interruption units whose slits are different in width or length, the inductance of the transmission coil 115 or the reception coil 126 can be easily and finely adjusted to reach a preset inductance.

By realizing the plurality of types of processed electrically-conductive members whose eddy current interruption units are different in form from each other using a pair of electrically-conductive plates in this way, the number of electrically-conductive plates required for the processed electrically-conductive members to be realized can be reduced. Accordingly, costs can be reduced. By shifting a pair of electrically-conductive plates away from each other, the form of the eddy current interruption unit can be changed to a number of different forms little by little, and the inductance of the transmission coil 115 or the reception coil 126 can be brought closer to a value that is set in advance.

In the above embodiment, a case where the wireless power-transmitting device according to the disclosure is applied to systems (devices) for charging batteries mounted on vehicles, such as electric vehicles or hybrid vehicles is described. However, the disclosure is not limited to this. For example, the disclosure can also be applied to the manufacture of wireless power-transmitting devices that supply the electric power for charging batteries provided in consumer appliances, such as consumer electronics, or wireless power-transmitting devices that supply the electric power that drives industrial devices (for example, stages, arms, cranes, robots, or the like).

Subsequently, a resonator according to an embodiment of the disclosure will be described below in detail with reference to the drawings. Here, the resonator of the present embodiment is constituted of a coil part having a coil, and a capacitor part having a capacitor. However, in order to simplify description, the coil part that is a characterizing part will be described, and the description of the capacitor part will be omitted.

Second Embodiment

Figure 4A:
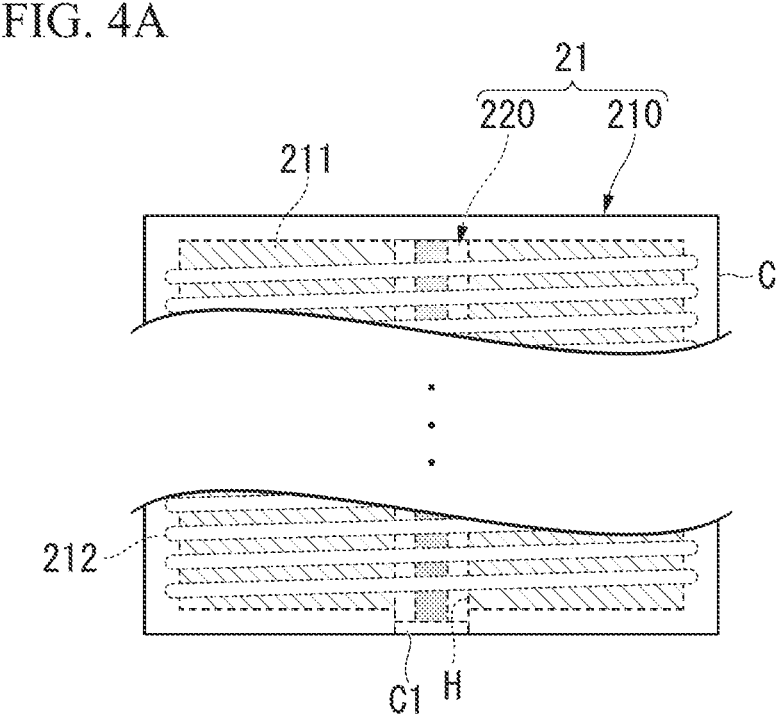
FIG. 4A is a view showing the configuration of main portions of a coil part provided in a resonator according to a second embodiment of the disclosure.
Figure 4B:
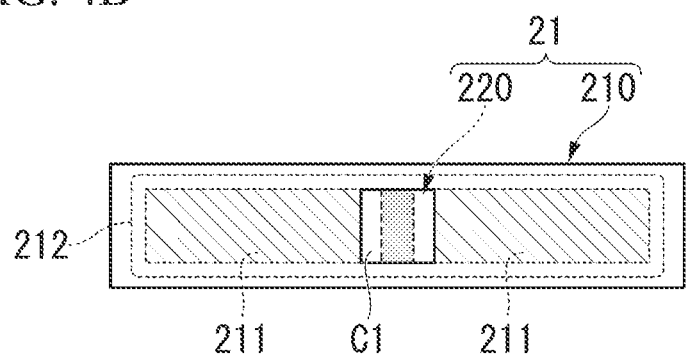
FIG. 4B is a view showing the configuration of the main portions of the coil part provided in the resonator according to the second embodiment of the disclosure.
Figure 5A:
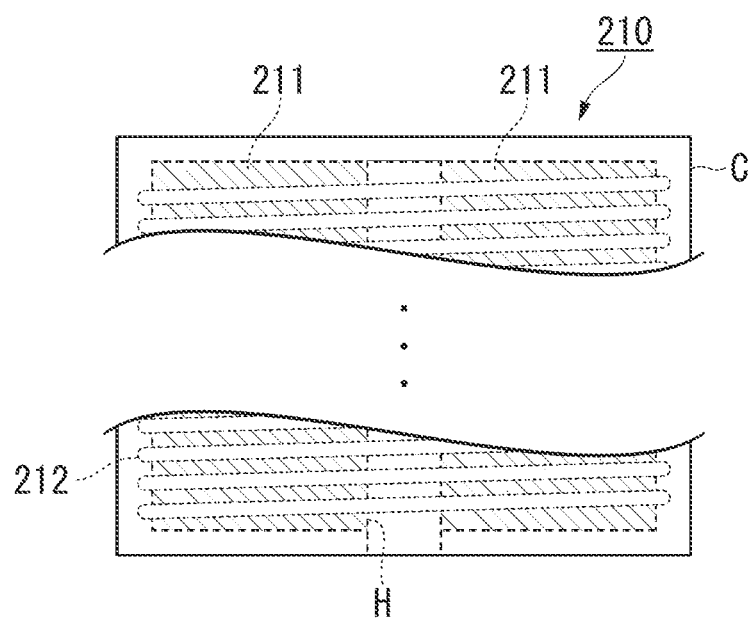
FIG. 5A is a view showing the configuration of main portions of a coil part main body in the second embodiment of the disclosure.
Figure 5B:
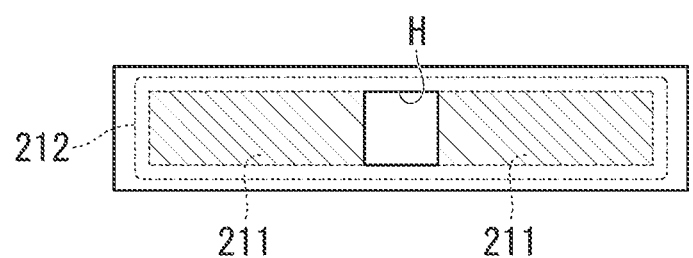
FIG. 5B is a view showing the configuration of the main portions of the coil part main body in the second embodiment of the disclosure.
Figure 6A:
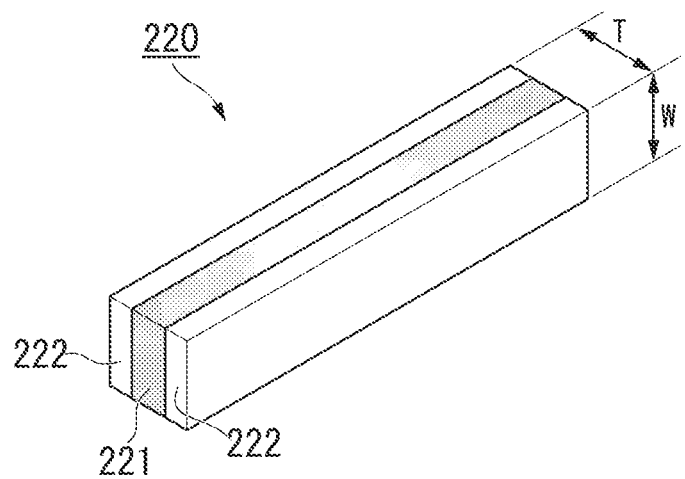
FIG. 6A is a view showing the configuration of an adjusting jigs in the second embodiment of the disclosure.
Figure 6B:
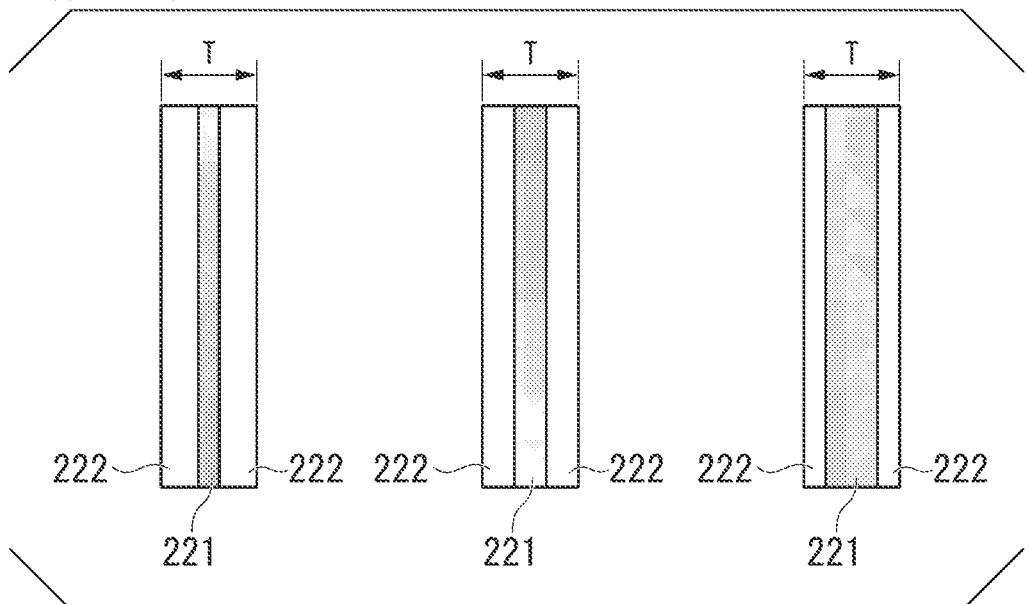
FIG. 6B is a view showing the configuration of the adjusting jigs in the second embodiment of the disclosure.

FIG. 4A is a front perspective view showing the configuration of main portions of a coil part provided in a resonator according to a second embodiment of the disclosure. FIG. 4B is a bottom perspective view showing the configuration of the main portions of the coil part provided in the resonator according to the second embodiment of the disclosure. As shown in FIGS. 4A and 4B, a resonator 21 includes a coil part main body 210 and an adjusting jig 220. FIG. 5A is a front perspective view showing the configuration of main portions of the coil part main body in the second embodiment of the disclosure. FIG. 5B is a bottom perspective view showing the configuration of the main portions of the coil part main body in the second embodiment of the disclosure. FIGS. 6A and 6B are views showing the configuration of the adjusting jigs in the second embodiment of the disclosure.

As shown in FIGS. 5A and 5B, the coil part main body 210 has a configuration that a core member 211 formed of a magnetic material and a coil 212 wound around the core member 211 are housed in a housing C. The core member 211 is a member that is formed of, for example, a magnetic material, such as ferrite and has a rectangular parallelepiped shape. A central portion of the core member 211 is formed with an adjustment hole H which is a hole for adjusting the inductance of the coil part main body 210 and into which an adjusting jig 220 that is a jig configured to adjust the inductance of the coil part main body 210 is inserted.

The adjustment hole H has a rectangular sectional shape as shown in FIG. 5B, and is formed so as to pass through the core member 211 in the axial direction of the coil 212 as shown in FIG. 5A. A cutout in which the adjusting jig 220 is inserted is formed at a position corresponding to the adjustment hole H in a bottom surface of the housing C. The resonance frequency of the resonator 21 is adjusted by adjusting the inductance of the coil part main body 210 using the adjusting jig 220.

The coil 212 is a coil (solenoid-type coil) in which a conducting wire, such as a round wire or a flat wire, is wound in a helix shape and in a square tubular shape around the core member 211, and is connected to a capacitor provided in the capacitor part that is not shown. This capacitor forms a resonance circuit together with the coil 212. The above conducting wire that forms the coil 212 is an insulating film covered wire in which the surface of a metal wire, such as copper (Cu) or silver (Ag), is covered with an insulating film. The diameter and the number of turns of the above conducting wire that forms the coil 212 are appropriately set according to the value of the inductance intended to be realized.

As shown in FIG. 6A, the adjusting jig 220 includes a plate-shaped magnetic body 221 and plate-shaped non-magnetic bodies 222 and 222, and lamination is made so that the magnetic body 221 is sandwiched by the non-magnetic bodies 222 and 222.

The entire adjusting jig 220 is inserted into the adjustment hole H formed in the core member 211 of the coil part main body 210 in order to adjust the inductance of the coil part main body 210. As shown in FIGS. 4A and 4B, in the coil part main body 210 of which the adjustment of the inductance is completed, the adjusting jig 220 is housed within the housing C, and a lid member C1 configured to prevent slip-out of the adjusting jig 220 is attached to the cutout formed in the bottom surface of the housing C.

The magnetic body 221 that forms the adjusting jig 220 is a plate-shaped member formed of, for example, a magnetic material, such as ferrite. In contrast, the non-magnetic bodies 222 and 222 that form the adjusting jig 220 are plate-shaped members formed of, for example, non-magnetic materials, such as acrylic resin. The width W of the magnetic body 221 and the non-magnetic bodies 222 and 222 is set to be equal to the size (internal diameter) of the adjustment hole H formed in the core member 211. The total thickness T of the magnetic body 221 and the non-magnetic bodies 222 and 222 that are laminated is set to be equal to the size (internal diameter) of the adjustment hole H formed in the core member 211.

That is, the width and the thickness of the adjusting jig 220 are set to be equal to the size (internal diameter) of the adjustment hole H. When the width and the thickness of the adjusting jig 220 are the same, the adjusting jig 220 may be inserted in a state shown in FIG. 4B, or the adjusting jig 220 may be inserted in a state where the adjusting jig is rotated by 90° from the state shown in FIG. 4B. When adjusting the inductance of the coil part main body 210, it is considered that not only the adjusting jig 220 is inserted into the adjustment hole H, but the adjusting jig 220 inserted into the adjustment hole H is taken out. For this reason, it is desirable that the width and the thickness of the adjusting jig 220 be set to be slightly smaller than the size (internal diameter) of the adjustment hole H.

Here, although the widths and the thicknesses of the adjusting jigs 220 are the same as shown in FIG. 6B, a plurality of the adjusting jigs 220 in which the thicknesses of the magnetic bodies 221 are different from each other are prepared in advance. Such adjusting jigs 220 are different from each other in permeability. For this reason, in a certain adjusting jig 220, the inductance of the coil part main body 210 cannot be completely adjusted, or the adjustment of the inductance may be insufficient. Even in such a case, it is possible to adjust the inductance of the coil part main body 210 by replacing the existing adjusting jig with an adjusting jig 220 (an adjusting jig 220 having the magnetic body 221 with a thickness suitable for the adjustment of the inductance) of which the thickness of the magnetic body 221 is different.

Although the adjusting jigs 220 shown in FIG. 6B are different from each other in the thickness of the magnetic body 221, the widths and the thicknesses (overall thicknesses T) thereof are made the same by adjusting the thickness of the non-magnetic bodies 222 according to the thickness of the magnetic body 221. For this reason, the non-magnetic bodies 222 provided in the adjusting jig 220 can also be referred to as "members that absorb a difference between the thicknesses of the magnetic bodies 221 to make the overall thicknesses T of the adjusting jigs 220 be a constant thickness (a thickness suitable for the size of the adjustment hole H)".

The adjusting jigs 220 shown in FIG. 6B can be formed by preparing the non-magnetic bodies 222 having a thickness according to the thickness of the magnetic body 221 in advance and by laminating the magnetic body 221 and the non-magnetic bodies 222 and performing compression or the like on these bodies. However, in addition to the magnetic bodies 221 with different thicknesses, time and efforts are taken to prepare the plurality of non-magnetic bodies 222 with different thicknesses. For this reason, for example, a plurality of thin plates made of magnetic bodies and a plurality of thin plates made of non-magnetic bodies, which have reference thicknesses that are specified in advance, are prepared, respectively, and the number of the thin plates made of the magnetic bodies and the number of the thin plates of the non-magnetic bodies to be laminated according to the thicknesses of the magnetic bodies 221 to be formed are adjusted. Also, the adjusting jigs 220 may be formed, for example, by performing compression or the like on the thin plates made of the magnetic bodies and the thin plates made of the non-magnetic bodies that are laminated.

Next, a method for adjusting the resonance frequency (the inductance of the coil part main body 210) of the resonator 21 in the above configuration will be described. Here, in order to simplify description, it is assumed that the adjusting jigs (the plurality of adjusting jigs in which the thicknesses of the magnetic bodies 221 are different from each other) shown in FIG. 6B are prepared in advance. It is assumed that adjusting jigs are capable of approximately adjusting the inductances of the coil part main bodies 210. An example in which the resonance frequency of the resonator 21 is adjusted in an installation place of the coil part main body 210 will be described herein.

First, the work of installing the coil part main body 210 conveyed to an installation place is performed by a worker. Here, for example, when an iron plate or the like is provided in the installation place of the coil part main body 210, and the coil part main body 210 is installed on the iron plate or the like, a change may occur in the inductance of the coil part main body 210. Next, the worker performs the adjustment work (the adjustment work of the resonance frequency of the resonator 21) of the inductance of the installed coil part main body 210 using the adjusting jigs 220.

Specifically, one (an adjusting jig to be assumed to be capable of approximately adjusting the inductance of the coil part main body 210) of the adjusting jigs 220 is inserted into the adjustment hole H of the coil part main body 210, and it is checked whether or not the resonance frequency of the resonator 21 reaches a required resonance frequency. When it is confirmed that the resonance frequency of the resonator 21 has not reached the required resonance frequency, the worker takes out an adjusting jig 220 inserted into the adjustment hole H, and inserts another adjusting jig 220 (an adjusting jig 220 of which the thickness of the magnetic body 221 is different) into the adjustment hole H of the coil part main body 210. Then, it is checked again whether or not the resonance frequency of the resonator 21 reaches the required resonance frequency. In contrast, when it is confirmed that the resonance frequency of the resonator 21 reaches the required resonance frequency, the worker attaches the lid member C1 to the bottom surface of the housing C, and finishes the adjustment work.

As above, in the present embodiment, the resonance frequency is adjusted by forming the adjustment hole H for adjustment of the resonance frequency in the core member 211 of the coil part main body 210, and inserting the adjusting jig 220 formed of the magnetic body 221 and the non-magnetic bodies 222 into the adjustment hole H. Accordingly, since the adjustment of the resonance frequency can be performed simply by inserting the adjusting jig 220 into the adjustment hole H, it is possible to easily adjust the resonance frequency in a short amount of time.

Third Embodiment

Figure 7A:
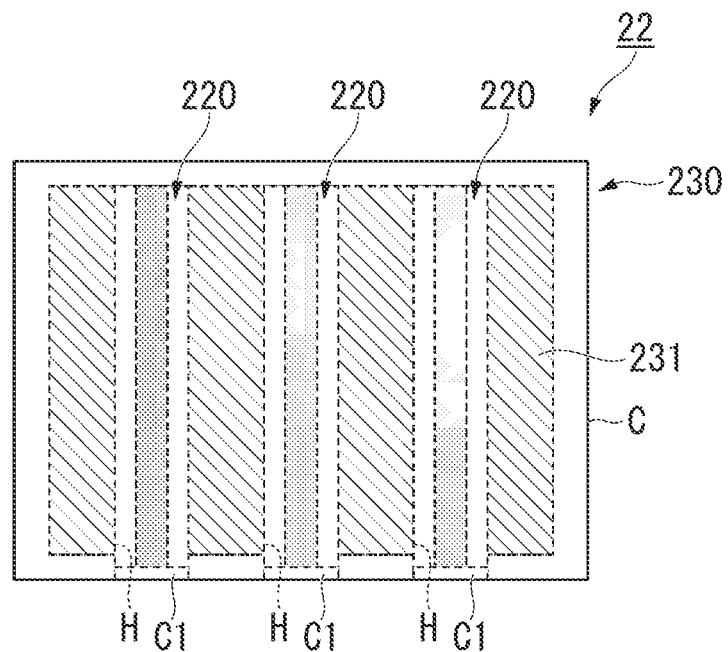
FIG. 7A is a view showing the configuration of main portions of a coil part provided in a resonator according to a third embodiment of the disclosure.
Figure 7B:
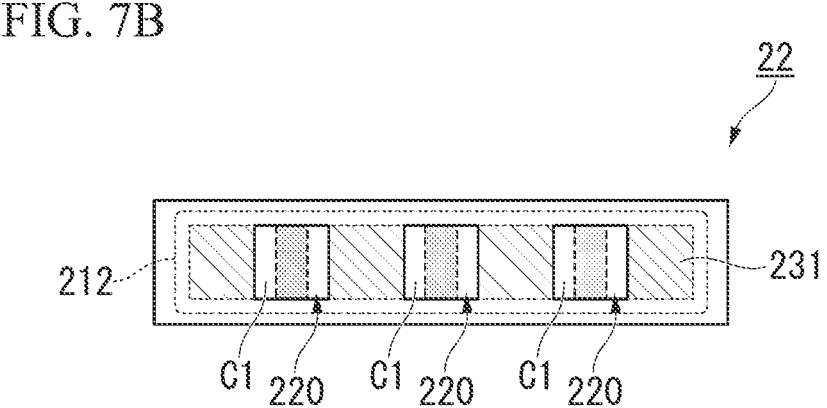
FIG. 7B is a view showing the configuration of the main portions of the coil part provided in the resonator according to the third embodiment of the disclosure.

FIG. 7A is a front perspective view showing the configuration of main portions of a coil part provided in a resonator according to a third embodiment of the disclosure. FIG. 7B is a bottom perspective view showing the configuration of the main portions of the coil part provided in the resonator according to the third embodiment of the disclosure. The coil 212 is omitted in FIG. 7A in order to avoid complication of the drawing and to facilitate understanding.

In FIGS. 7A and 7B, the same reference numerals are given to the same members as the members shown in FIGS. 4A and 4B.

As shown in FIGS. 7A and 7B, the resonator 22 of the present embodiment is provided with a coil part main body 230 instead of the coil part main body 210 in FIGS. 4A and 4B and is able to include a plurality of the adjusting jigs 220. The coil part main body 230 has a configuration that a core member 231 formed of a magnetic material and the coil 212 (refer to FIG. 7B) wound around the core member 231 are housed in the housing C. Although the core member 231, similar to the core member 211, is a member that is formed of a magnetic material, such as ferrite, and has a rectangular parallelepiped shape, the core member 231 is different from the core member 211 in that adjustment holes H are in a plurality of places (three places in the example shown in FIGS. 7A and 7B).

In the resonator 22 having this configuration, one or a plurality of adjusting jigs 220 can be inserted into the plurality of adjustment holes H formed in the core member 231. That is, in the present embodiment, the number of the adjusting jigs 220 inserted into the adjustment holes H depends on the desired amount of adjustment of the resonance frequency of the resonator 22. In the resonator 22 of the present embodiment, since one or a plurality of the adjusting jigs 220 can be inserted, the adjustable range of the inductance is wider than that of the resonator 1 of the first embodiment.

As above, in the present embodiment, the resonance frequency is adjusted by forming the plurality of adjustment holes H for adjustment of the resonance frequency in the core member 231 of the coil part main body 230, and inserting at least one adjusting jig 220 formed of the magnetic body 221 and the non-magnetic bodies 222 into the adjustment holes H. Accordingly, since the adjustment of the resonance frequency can be performed simply by inserting the adjusting jigs 220 into the adjustment holes H, it is possible to easily adjust the resonance frequency in a short amount of time.

Fourth Embodiment

Figure 8A:
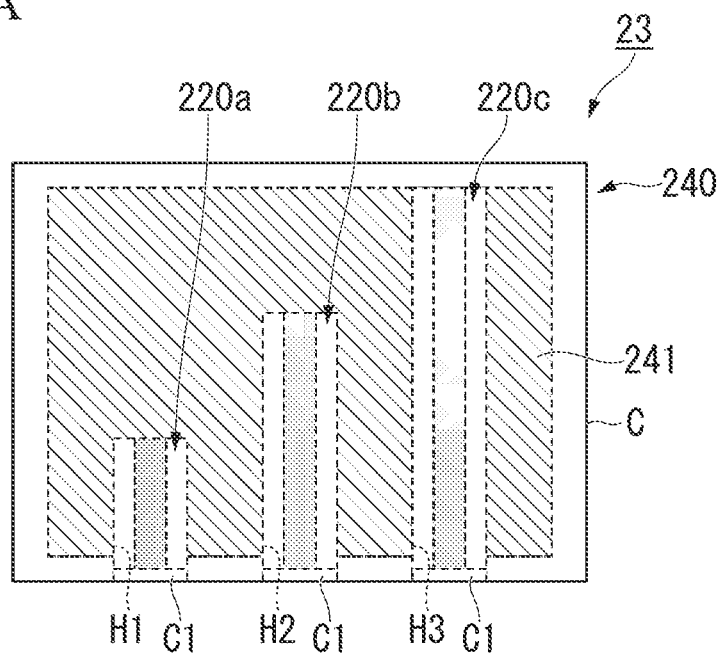
FIG. 8A is a view showing the configuration of main portions of a coil part provided in a resonator according to a fourth embodiment of the disclosure.
Figure 8B:
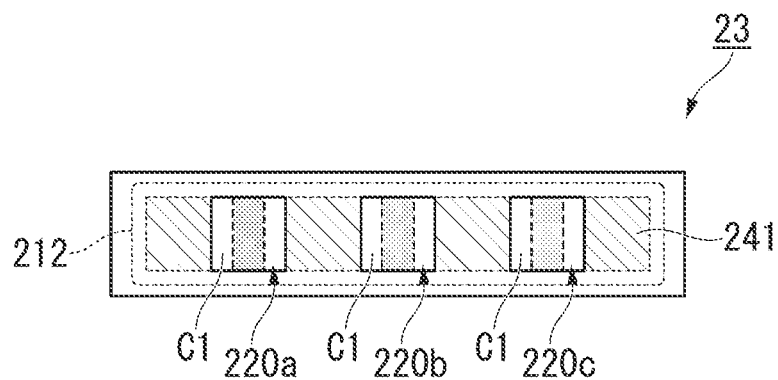
FIG. 8B is a view showing the configuration of the main portions of the coil part provided in the resonator according to the fourth embodiment of the disclosure.

FIG. 8A is a front perspective view showing the configuration of main portions of a coil part provided in a resonator according to a fourth embodiment of the disclosure. FIG. 8B is a bottom perspective view showing the configuration of the main portions of the coil part provided in the resonator according to the fourth embodiment of the disclosure. Similar to FIG. 7A, illustration of the coil 212 is omitted in FIG. 8A in order to avoid complication of the drawing and to facilitate understanding. In FIGS. 8A and 8B, the same reference numerals are given to the same members as the members shown in FIGS. 4A and 4B and FIGS. 7A and 7B.

As shown in FIGS. 8A and 8B, the resonator 23 of the present embodiment is provided with a coil part main body 240 instead of the coil part main body 230 in FIGS. 7A and 7B, and is able to include adjusting jigs 220a to 220c having different lengths. The coil part main body 240 has a configuration that a core member 241 formed of a magnetic material and the coil 212 (refer to FIG. 8B) wound around the core member 241 are housed in the housing C. Although the core member 241, similar to the core member 231, is a member that is formed of a magnetic material, such as ferrite, and has a rectangular parallelepiped shape, the core member 241 is different from the core member 231 in that adjustment holes H1 to H3 having different depths are formed.

Figure 9A:
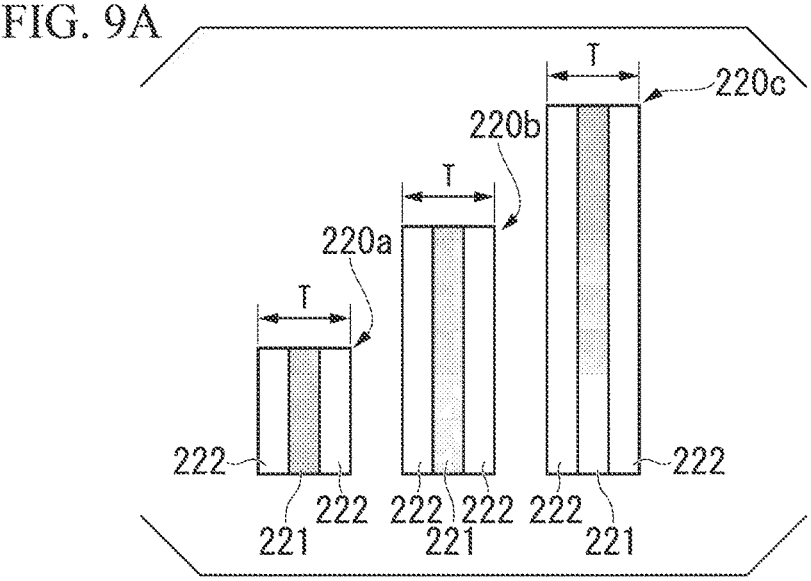
FIG. 9A is a view showing the configuration of adjusting jigs in the fourth embodiment of the disclosure.
Figure 9B:
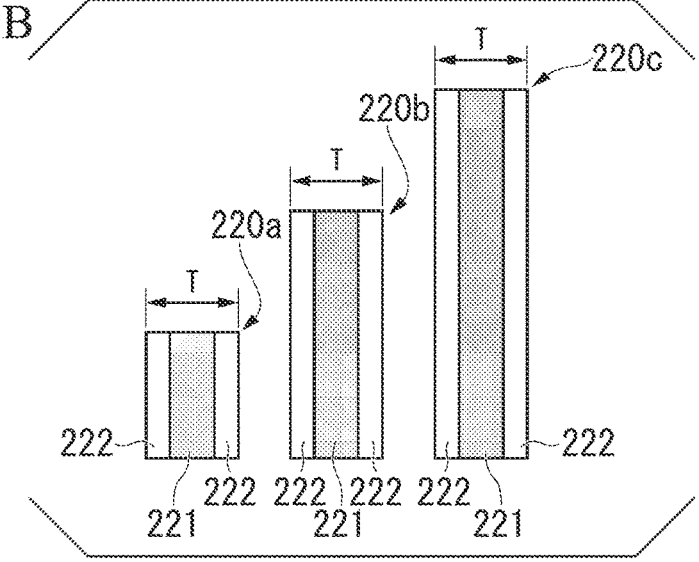
FIG. 9B is a view showing the configuration of the adjusting jigs in the fourth embodiment of the disclosure.

FIGS. 9A and 9B are views showing the configuration of the adjusting jigs in the fourth embodiment of the disclosure. As shown in FIGS. 9A and 9B, the adjusting jigs 220a to 220c, similar to the adjusting jigs 220 shown in FIGS. 6A and 6B, have a configuration in which lamination is made so that the plate-shaped magnetic body 221 is sandwiched by the plate-shaped non-magnetic bodies 222 and 222, and are different from each other in length. As shown in FIGS. 9A and 9B, as for each of the adjusting jigs 220a to 220c, a plurality of adjusting jigs 220a to 220c having the same length but having different thicknesses of the magnetic bodies 221 are prepared.

In the resonator 23 having this configuration, the adjusting jigs 220a to 220c can be respectively inserted into the adjustment holes H1 to H3 formed in the core member 241. That is, in the present embodiment, the adjusting jigs 220a to 220c having lengths suitable for the depths of the adjustment holes H1 to H3 are inserted into the adjustment holes H1 to H3. In the resonator 23 of the present embodiment, since the adjusting jigs 220a to 220c having different lengths can be inserted, the inductance can be more finely adjusted than that of the resonator 22 of the second embodiment.

As above, in the present embodiment, the resonance frequency is adjusted by forming the adjustment holes H1 to H3 having different depths in the core member 241 of the coil part main body 240 and inserting the adjusting jigs 220a to 220c having lengths suitable for the depths of the adjustment holes H1 to H3 into the adjustment holes H1 to H3, respectively. Accordingly, since the adjustment of the resonance frequency can be performed simply by inserting the adjusting jigs 220a to 220c into the adjustment holes H1 to H3, it is possible to easily adjust the resonance frequency in a short amount of time.

Fifth Embodiment

Figure 10:
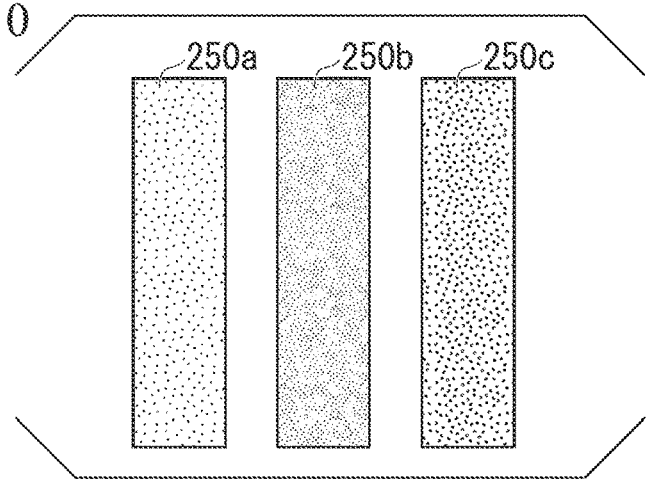
FIG. 10 is a view showing the configuration of adjusting jigs in a fifth embodiment of the disclosure.

FIG. 10 is a view showing the configuration of adjusting jigs in a fifth embodiment of the disclosure. As shown in FIG. 10, adjusting jigs 250a to 250c in the present embodiment are formed by mixing a powdered magnetic material, such as ferrite, with a powdered non-magnetic material, such as an acrylic resin, and are different from each other in the ratio of the magnetic material to the non-magnetic material.

The widths and the thicknesses (overall thicknesses T) of such adjusting jigs 250a to 250c are made to be the same as those of the adjusting jigs 220 shown in FIGS. 6A and 6B. For this reason, in the first and second embodiments, it is possible to adjust the resonance frequency using the adjusting jigs 250a to 250c instead of the adjusting jigs 220. By making the respective lengths of the adjusting jigs 250a to 250c different from each other, similar to the adjusting jigs 220a to 220c shown in FIGS. 9A and 9B, in the third embodiment, the adjusting jigs 250a to 250c can be used instead of the adjusting jigs 220a to 220c.

Here, in the present embodiment, the adjusting jigs 250a to 250c whose ratio of the magnetic material to the non-magnetic material is set at a value suitable for the adjustment of the resonance frequency are inserted into the adjustment holes (the adjustment holes H shown in FIGS. 5A and 5B and FIGS. 7A and 7B or the adjustment holes H1 to H3 shown in FIGS. 8A and 8B) after the adjustment of the resonance frequency. In this way, even in the present embodiment, similar to the above-described first to third embodiments, the resonance frequency is adjusted by inserting the adjusting jigs 250a to 250c into the adjustment holes H1 to H3, respectively. Accordingly, since the adjustment of the resonance frequency can be performed simply by inserting the adjusting jigs 220a to 220c into the adjustment holes H1 to H3, it is possible to easily adjust the resonance frequency in a short amount of time.

Sixth Embodiment

Figure 11A:
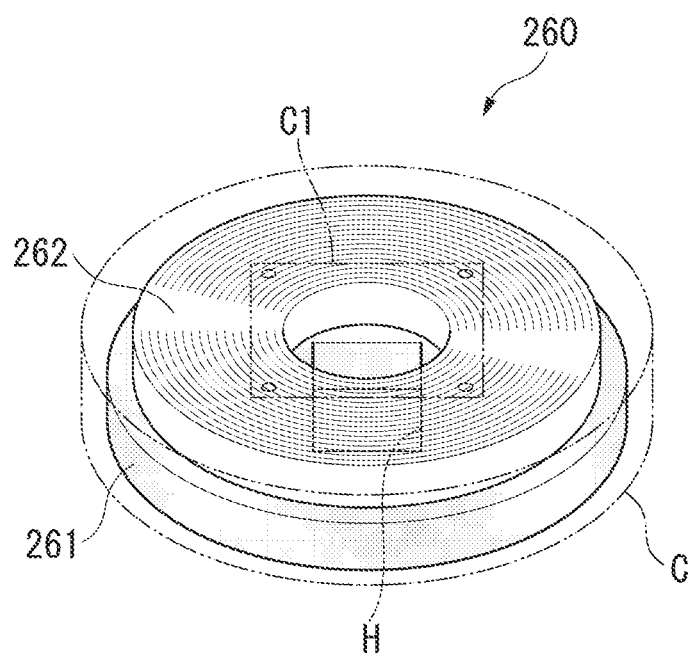
FIG. 11A is a view showing the configuration of main portions of a coil part main body in a sixth embodiment of the disclosure.
Figure 11B:
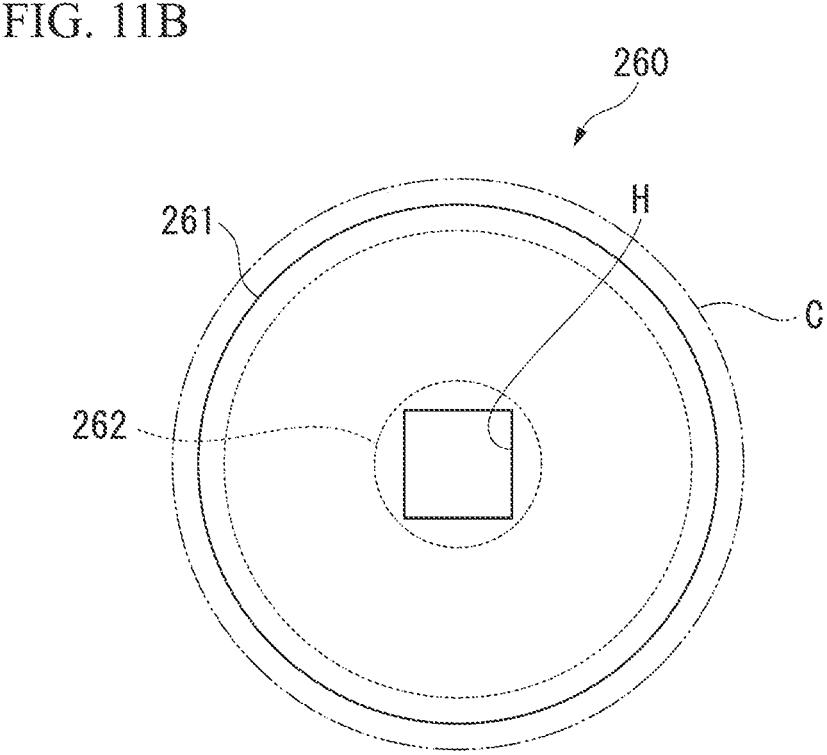
FIG. 11B is a view showing the configuration of the main portions of the coil part main body in the sixth embodiment of the disclosure.
Figure 12:
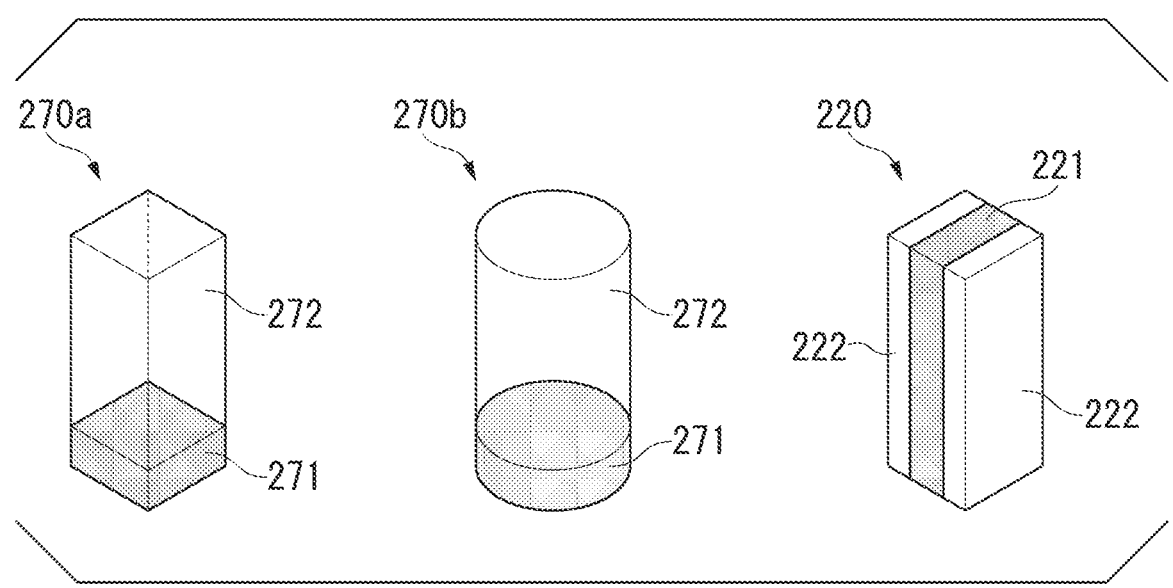
FIG. 12 is a view showing the configuration of adjusting jigs in the sixth embodiment of the disclosure.

FIG. 11A is a see-through perspective view showing the configuration of main portions of a coil part main body in a sixth embodiment of the disclosure. FIG. 11B is a bottom perspective view showing the configuration of the main portions of the coil part main body in the sixth embodiment of the disclosure. FIG. 12 is a view showing the configuration of adjusting jigs in the sixth embodiment of the disclosure. The coil part main bodies 210, 230, and 240 described in the aforementioned second to fourth embodiments include the solenoid type coil 212. In contrast, a coil part main body 260 in the present embodiment includes a coil 262 that is spirally wound within a plane.

Specifically, the coil part main body 260 has a configuration in which a core member 261 formed of a magnetic material, and the coil 262 arranged in proximity to one surface side (an upper surface side in the example shown in FIG. 11A and FIG. 11B) of the core member 261 are housed in the housing C. The core member 261 is a member that is formed of, for example, a magnetic material, such as ferrite and has a disk shape. A central portion of the core member 261 is formed with an adjustment hole H which is a hole for adjusting the inductance of the coil part main body 260 and into which an adjusting jig 270a (or the adjusting jig 220 or 270b) shown in FIG. 12 is inserted.

The adjustment hole H, as shown in FIG. 11B, is formed so that the sectional shape (a top view shape) thereof is, for example, a rectangular shape. Although will be described below in detail, a hole is provided at a central portion of the coil 262. Thus, when the coil part main body 260 is seen through from the top, the upside of the adjustment hole H formed in the core member 261 is not covered with the coil 262. Here, when the columnar adjusting jig 270b shown in FIG. 12 is used, the sectional shape of the adjustment hole H is a circular shape. That is, the sectional shape of the adjustment hole H is formed in a shape according to the sectional shape of the adjusting jig (contrary to this, it can also be said that the sectional shape of the adjusting jig is formed in a shape according to the sectional shape of the adjustment hole H).

A cutout in which the adjusting jig 270a (or the adjusting jig 220 or 270b) is inserted is formed at a central portion of a top surface of the housing C. The cutout may be formed at a central portion of a bottom surface of the housing C. The resonance frequency of the resonator of the present embodiment is adjusted by adjusting the inductance of the coil part main body 260 using the adjusting jig 270a (or the adjusting jig 220 or 270b).

The coil 262 is a coil in which a conducting wire, such as a round wire or a flat wire, is spirally wound within a plane, and is connected to a capacitor (not shown) that forms a resonance circuit together with the coil 262. The central portion of the coil 262 has no conducting wire wound therearound, and is formed as a hole. That is, the coil 262 can also be referred to as an annular coil having almost the same inner diameter as the diameter of the adjusting jig 270a or an annular coil having slightly larger inner diameter than the diameter of the adjusting jig 270a.

As shown in FIG. 12, the adjusting jig 270a includes a square plate-shaped magnetic body 271 and a quadrangular prismatic non-magnetic body 272, and is formed in the shape of a quadrangular prism as a whole by providing the magnetic body 271 at one end (at the bottom in the example shown in FIG. 12) of the non-magnetic body 272. The entire adjusting jig 270a is inserted into the central portion of the coil part main body 260 so that the magnetic body 271 is arranged in the adjustment hole H formed in the core member 261 in order to adjust the inductance of the coil part main body 260. In the central portion of the coil part main body 260 of which the adjustment of the inductance is completed, the adjusting jig 270a is housed within the housing C, and the lid member C1 for preventing slip-out of the adjusting jig 270a is attached to a cutout formed at the central portion of the top surface of the housing C.

The magnetic body 271 that forms the adjusting jig 270a is formed of, for example, a magnetic material, such as ferrite, and the non-magnetic body 272 is formed of, for example, a non-magnetic material, such as acrylic resin.

Here, as for the adjusting jig 270a, a plurality of the adjusting jigs 270a that have the same external shape (that is, having the same width, thickness, and length) but are different from each other in the thickness of the magnetic body 271 (in other words, adjusting jigs 270a that are different from each other in the ratio of the thickness of the magnetic body 271 to the length of the non-magnetic body 272) are prepared in advance.

The adjusting jig 270b shown in FIG. 12 is different from the adjusting jig 270a only in its external shape, and is the same as the adjusting jig 270a in its basic structure. That is, the adjusting jig 270b includes a disc-shaped magnetic body 271 and a columnar non-magnetic body 272, and is formed in a columnar shape as a whole by providing the magnetic body 271 at one end (at the bottom in the example shown in FIG. 12) of the non-magnetic body 272. In the present embodiment, it is also possible to use the adjusting jigs 220 shown in FIGS. 6A and 6B.

Since the adjustment of the resonance frequency (the inductance of the coil part main body 260) of the resonator in the present embodiment is performed by the same method as the first embodiment, the detailed description thereof will be omitted herein. As above, in the present embodiment, the resonance frequency is adjusted by forming the adjustment hole H for adjustment of the resonance frequency in the core member 261 of the coil part main body 260, and inserting the adjusting jig 270a (or the adjusting jig 220 or 270b) formed of the magnetic body 271 and the non-magnetic body 272 into the adjustment hole H. Accordingly, since the adjustment of the resonance frequency can be performed simply by inserting the adjusting jig 270a into the adjustment hole H, it is possible to easily adjust the resonance frequency in a short amount of time.

Although the resonators according to the embodiments of the disclosure have been described above, the disclosure is not limited to the above embodiments, and changes can be freely made within the scope of the disclosure. For example, although cases in which the core members 211, 231, and 241 have the rectangular parallelepiped shape have been described as examples in the above second to fourth embodiments, the shape of the core members 211, 231, and 241 may be other shapes, such as a cylindrical shape. The sectional shape of the adjustment holes H and H1 to H3 and the adjusting jigs 220, 220a to 220c, and 250a to 250c is not limited to the rectangular shape, but may be other shapes, such as a circular shape.

In the above respective embodiments, in order to improve efficiency, shield members may be provided inside or outside the housings of the coil part main bodies 210, 230, 240, and 260. The shield members may be formed of, mainly, metal with high conductivity, such as aluminum (Al) or copper (Cu).

INDUSTRIAL APPLICABILITY

According to the method for manufacturing the wireless power-transmitting device of the disclosure, the inductance of the transmission coil or the reception coil is finely adjusted so that the transmission coil or the reception coil has a preset inductance by preparing the plurality of types of processed electrically-conductive members whose eddy current interruption units are different in form from each other and selecting one type of processed electrically-conductive member from these processed electrically-conductive members. Therefore, the inductance of the coil can be finely adjusted simply by the replacement of the processed electrically-conductive members. Accordingly, the inductance of the transmission coil or the reception coil can be easily and finely adjusted, for example, even after the power-transmitter or the power-receiver is assembled. Hence, manufacturing costs can be reduced.

According to the resonator of the disclosure, the resonance frequency is adjusted by forming the adjustment hole for adjustment of the resonance frequency in the core member, and inserting the adjusting jig formed of the magnetic material and the non-magnetic material into the adjustment hole. Therefore, since the adjustment of the resonance frequency can be performed simply by inserting the adjusting jig into the adjustment hole, it is possible to easily adjust the resonance frequency in a short amount of time.

What is claimed is:

1. A resonator on a power-transmitting side or a power-receiving side of a wireless power-transmitting system comprising:
   a core member formed of a magnetic material and provided with an adjustment hole for adjustment of a resonance frequency of the resonator on the power-transmitting side or the power-receiving side of the wireless power-transmitting system;
   a transmission or reception coil wound around the core member; and
   an adjusting jig formed of a magnetic material and a non-magnetic material and configured to be inserted into the adjustment hole to adjust the resonance frequency, wherein
   the adjustment hole is formed so as to pass through the core member in an axial direction of the transmission or reception coil from one end of the core to another end of the core,
   the adjustment jig, when inserted, extends in the axial direction into the adjustment hole from one end of the core to the other end of the core,
   the core member is provided with a plurality of the adjustment holes,
   the resonator comprises one or more of the adjusting jigs and a number of the one or more adjusting jigs inserted into the adjustment holes depends on an amount of adjustment of the resonance frequency, and
   axial directions of the plurality of the adjustment holes are parallel with an axial direction of the transmission coil or an axial direction of the reception coil, and the plurality of the adjustment holes are spaced from each other.

2. The resonator according to claim 1,
   wherein the core member is provided with a plurality of the adjustment holes having different depths, and
   the adjusting jig is inserted into the adjustment hole having a depth suitable for receiving a length of the adjusting jig.

3. The resonator according to claim 1,
   wherein the adjusting jig includes a plate-shaped magnetic body and a plate-shaped non-magnetic body that is laminated on the magnetic body such that a thickness of the adjusting jig is suitable for a size of the adjustment hole, and
   wherein the adjusting jig is inserted into the adjustment hole.

4. The resonator according to claim 1,
   wherein the adjusting jig is a mixture of a magnetic material and a non-magnetic material, and the adjusting jig whose ratio of the magnetic material to the non-magnetic material is set at a value suitable for the adjustment of the resonance frequency is inserted into the adjustment hole.

5. The resonator according to claim 1, further comprising:
a lid member configured to prevent slip-out of the adjusting jig inserted into the adjustment hole.

6. The resonator according to claim 1, further comprising:
a capacitor that is connected to the transmission or reception coil and forms a resonance circuit together with the transmission or reception coil.

7. The resonator according to claim 1,
wherein a plurality of the adjusting jigs are provided,
thicknesses of a plurality of the magnetic materials of the plurality of the adjusting jigs are different from each other, and
one of the plurality of the adjusting jigs is configured to be inserted into the adjustment hole such that the resonance frequency is adjusted.

8. A resonator on a power-transmitting side or a power-receiving side of a wireless power-transmitting system comprising:
a core member formed of a magnetic material and provided with a plurality of adjustment holes, having different depths, to adjust a resonance frequency of the resonator on the power-transmitting side or the power-receiving side of the wireless power-transmitting system;
a transmission or reception coil wound around the core member; and
a plurality of adjusting jigs having different lengths and each formed of a magnetic material and a non-magnetic material and configured to be inserted into the plurality of adjustment holes to adjust the resonance frequency, wherein
axial directions of the plurality of adjustment holes are parallel with an axial direction of the transmission coil or an axial direction of the reception coil, and the plurality of adjustment holes are spaced from each other, each adjustment jig is configured to be inserted into one of the adjustment holes having a depth configured to receive a length of one of the adjustment jigs,
at least one of the plurality of the adjustment holes is formed so as to pass through the core member in the axial direction of the transmission or reception coil from one end of the core to another end of the core, and
the adjustment jig, when inserted, extends in the axial direction into the adjustment hole from the one end of the core to the other end of the core.

9. The resonator according to claim 8,
wherein the adjusting jig includes a plate-shaped magnetic body and a plate-shaped non-magnetic body that is laminated on the magnetic body to set the thickness of the adjusting jig to a thickness suitable for a size of the plurality of the adjustment holes, and
wherein each adjusting jig, having the magnetic body with a thickness suitable for the adjustment of the resonance frequency, is configured to be inserted into one of the plurality of adjustment holes.

10. The resonator according to claim 8,
wherein the adjusting jig, whose ratio of the magnetic material to the non-magnetic material is set at a value suitable for the adjustment of the resonance frequency, is configured to be inserted into the plurality of the adjustment holes.

11. The resonator according to claim 8, further comprising:
a lid member configured to prevent slip-out of the adjusting jig inserted into the plurality of the adjustment holes.

12. The resonator according to claim 8, further comprising:
a capacitor that is connected to the transmission or reception coil and forms a resonance circuit together with the transmission or reception coil.

* * * * *